C. LOMBARDO.
AUTOMOBILE SIGNAL.
APPLICATION FILED DEC. 12, 1916.

1,311,408.

Patented July 29, 1919.
2 SHEETS—SHEET 1.

Inventor,
Charles Lombardo.

By

Attorney

C. LOMBARDO.
AUTOMOBILE SIGNAL.
APPLICATION FILED DEC. 12, 1916.
1,311,408.
Patented July 29, 1919.
2 SHEETS—SHEET 2.
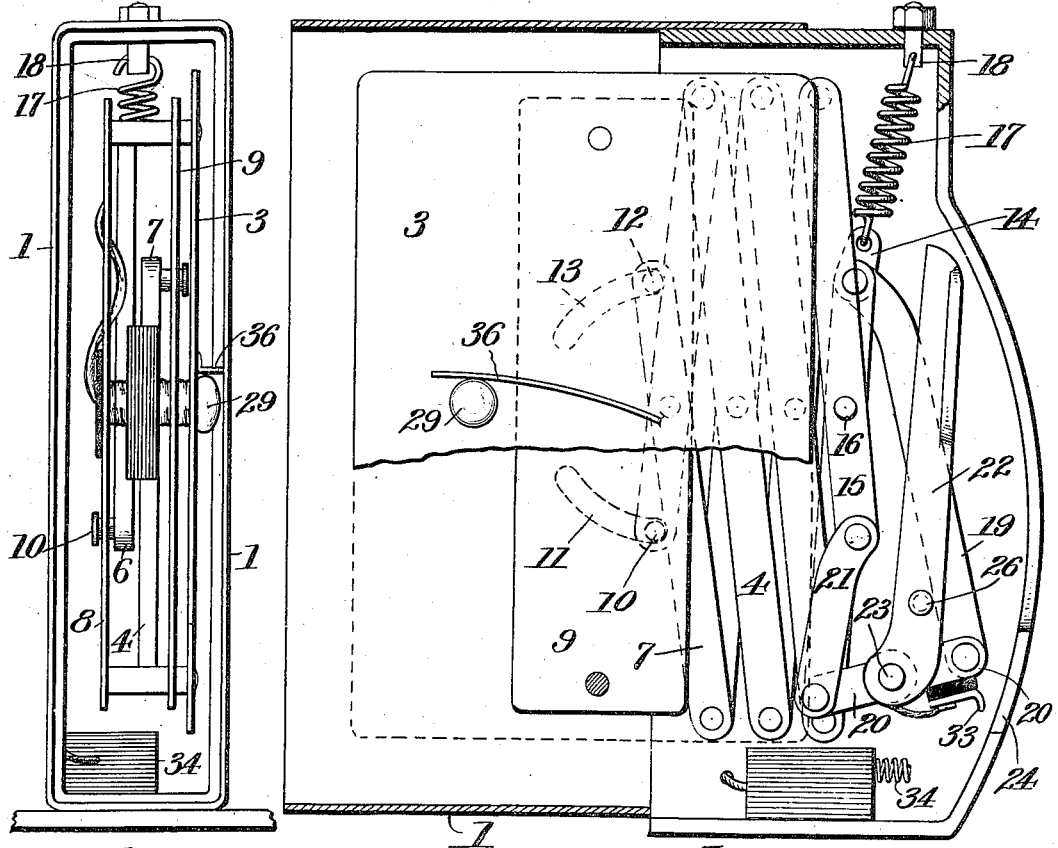
Fig. 4.   Fig. 5.
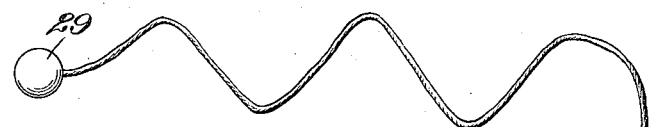
Fig. 6.
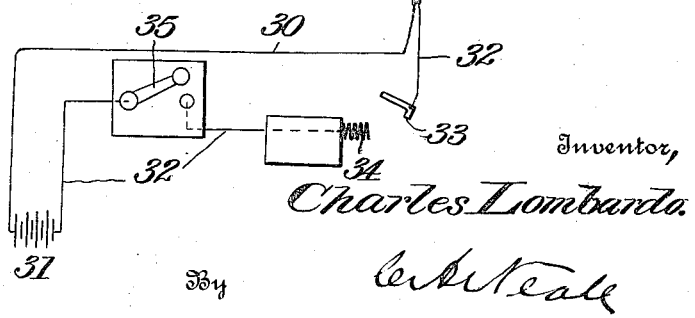
Inventor,
Charles Lombardo.
By
C. A. Neale
Attorney

UNITED STATES PATENT OFFICE.

CHARLES LOMBARDO, OF WATERFORD, NEW JERSEY.

AUTOMOBILE-SIGNAL.

1,311,408.     Specification of Letters Patent.     Patented July 29, 1919.

Application filed December 12, 1916.   Serial No. 136,523.

*To all whom it may concern:*

Be it known that I, CHARLES LOMBARDO, a subject of the King of Italy, residing at Waterford, in the county of Camden and State of New Jersey, have invented a new and useful Improvement in Automobile-Signals, of which the following is a specification.

This invention relates to signaling devices for automobile and other vehicles, and has for its object to provide a device which may be projected laterally from a vehicle to which it is attached for the purpose of informing pedestrians, traffic policemen or drivers of other vehicles that the conveyance carrying the signal is about to stop or turn.

A special object is to provide for automatically illuminating the signal when it is fully projected, and to maintain said illumination as long as the signal is in that position. Another object is to improve the means of connection between the signal and a lazy tongs projecting device, whereby said signal will be supported in an upright position while being projected from and retracted into its casing, as well as when it is in either extreme position.

The invention will be first hereafter described in connection with the accompanying drawings, which constitute part of this specification, and then more specifically defined in the claim at the end of the description.

In the accompanying drawings, wherein similar reference characters are used to designate corresponding parts throughout the several views:—

Fig. 4 is an end view of the signaling device in its retracted position, looking in the open end of the casing.

Fig. 5 is a broken side view of the device in retracted position, and

Fig. 6 is a diagrammatic view of the circuit to the lamp for illuminating the signal.

Figure 1:
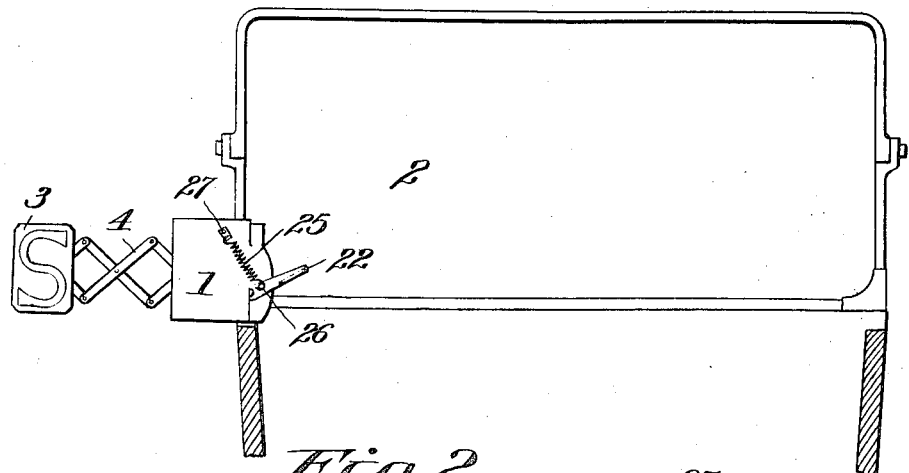
Figure 1 is an elevation of the windshield of an automobile showing the signaling device attached near to its base, the signal being in projected position.

The signaling device is carried in a casing or box 1 which may be attached to an automobile or other vehicle in any suitable manner, preferably at one side and near the windshield 2, as illustrated in Fig. 1, so that the signal may be projected beyond the side of the vehicle where drivers of other vehicles, pedestrians and traffic policemen will have a clear view of the same. It will be understood that the signal may bear any desired indicia, the letter "S" shown on both sides thereof in the drawings and indicating an intention to stop the vehicle, being used simply by way of example.

Figure 3:
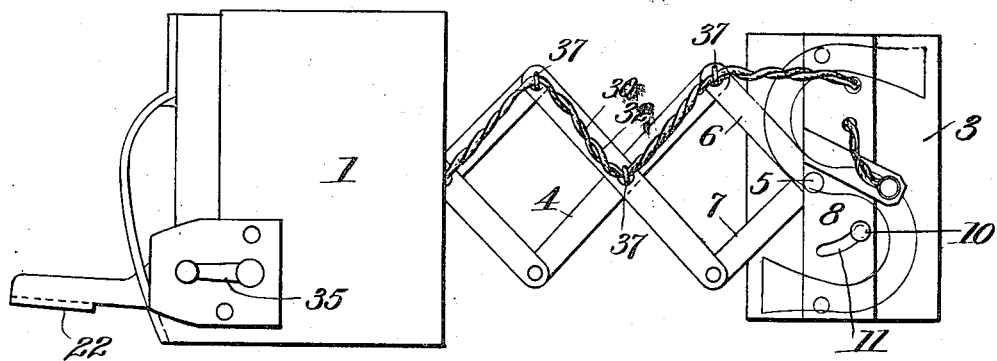
Fig. 3 is a reverse elevation of the signaling device in projected position.

The signal proper is in the form of a plate 3 mounted on the lazy tongs 4. The outermost pair of links 6 and 7 of the lazy tongs are both pivoted at 5 between a pair of plates 8 and 9 rigidly fastened together in spaced relation and mounted on the signal plate 3 as best shown in Figs. 3, 4 and 5. Both of said outermost links extend beyond the pivot 5 and the extremity of the link 6 carries a lug or pin 10 working in an arcuate slot 11 in the plate 8, while the extremity of the link 7 carries a similar lug 12 working in an arcuate slot 13 in the plate 9, whereby the signal plate 3 may be projected and retracted while always maintaining an upright position.

The innermost links 14 and 15 of the lazy tongs are both pivoted at 16 to the casing 1, as shown in Fig. 5, and their extremities extend beyond said pivot. The extremity of the link 14 is connected to a coiled spring 17 which is also attached to the casing, as at 18, and serves to automatically retract the signal when released. The extremity of the link 14 is also connected by means of a link 19 to one end of an intermediately pivoted lever 20, while the extremity of the link 15 is connected by a link 21 to the other end of said lever 20. An actuating lever 22, which projects beyond the casing 1, is rigidly connected to the lever 20 at its pivot so that said lever 20 may be rocked by swinging said actuating lever 22 on its pivot 23 which is also the pivot of the lever 20. By swinging the actuating lever 22 from the position shown in Fig. 5 to the position shown in Figs. 1 and 2, the lazy tongs will be projected by reason of the connection of the extremities of the links 14 and 15 to the opposite ends of the lever 20 by the links 19 and 21, whereas the swinging of said lever 22 in the opposite direction will retract the lazy tongs through the same instrumentalities.

Figure 2:
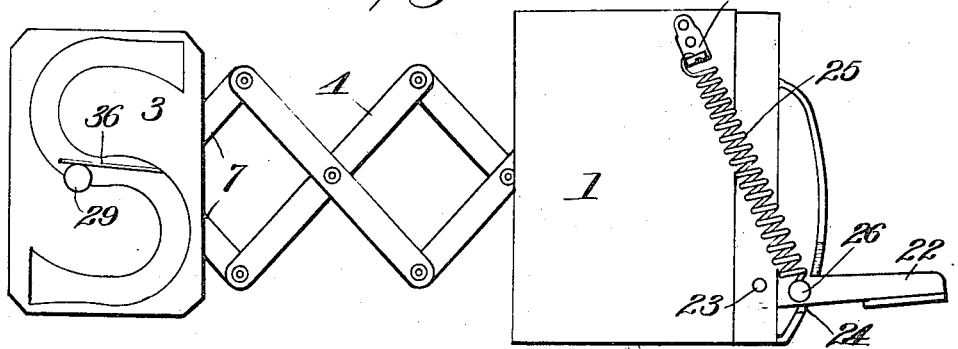
Fig. 2 is a detailed view of the signaling device in the same position as illustrated in Fig. 1 but drawn to a larger scale.

To retain the signal in projected position, against the action of the spring 17, a notch 24 is formed in the casing as indicated in Figs. 2 and 5, into which the lever 22 may be pushed laterally when the signal has been fully projected. A coiled spring 25, Figs. 1 and 2, is preferably provided for returning the lever 22 to normal position when released from the notch 24, said spring being connected to the lever 22 at 26 and to the casing at 27.

At night it is desirable to have the signal illuminated, and to this end a small electric lamp 29 is mounted on the signal plate 3. The circuit to said lamp, as illustrated in Fig. 6, is through a wire 30 to one pole of the battery 31, and from the other pole of said battery through a wire 32 running through two switches. One of these switches is of the contact type and consists of a contact plate 33 mounted on the lever 20, as shown in Fig. 5, and a supplemental yielding contact member 34 mounted in the casing in the path of the contact plate 33, so that when the signal is fully projected said contact plate 33 will engage the yielding or resilient contact member 34 and automatically illuminate the lamp 29 provided the other switch 35, which is of the usual cut-out type, is closed. The provision of the cut-out switch 35 permits the signal to be operated during daylight without illuminating the lamp. When the switch 35 is closed as when the vehicle is being run at night, the lamp will not only be illuminated automatically every time the signal is fully projected, but said illumination will be maintained as long as the signal is held in such position by means of the actuating lever 22 engaging the notch 24.

As illustrated in Figs. 2, 4 and 5, the signal plate 3 may be provided with a light deflecting vane 36 arranged at an incline above the lamp 29 for throwing the light downwardly and outwardly. The cords carrying the wires 30 and 32 may be loosely connected to the lazy tongs by loops 37 as shown in Fig. 3.

Having thus fully described my invention, what I claim as new and desire to secure by Letters Patent of the United States, is—

In a signal of the character described, a casing open at one end and having a slot in its opposite end extending for a portion of the height of said end, a lazy tongs adapted to be projected through the open end of the casing, a link pivoted to one of the inner end levers of the tongs, an operating handle pivoted in the casing for swinging movement through the slot interiorly and exteriorly of said casing, a rocking arm pivoted to the handle intermediate the ends of the arm and also pivoted to the link, a rod pivoted to the other inner end lever of the lazy tongs and to the arm at its end remote from the link, a signaling element having loose connection with the outer levers of the lazy tongs and supported vertically thereby, a coiled tension spring connected with the casing and with the first-named inner end lever of the lazy tongs, the signaling element having arcuate slots, and pins carried by the outer end levers of the tongs and engaged in said slots for preventing rocking movement of the signaling element.

CHARLES LOMBARDO.